United States Patent
Bothe et al.

(10) Patent No.: US 7,740,096 B2
(45) Date of Patent: Jun. 22, 2010

(54) DEVICE FOR ADJUSTING SEAT COMPONENTS

(75) Inventors: Hans-Dieter Bothe, Seelze (DE); Hoang Trinh, Ditzingen (DE); Heiko Freienstein, Weil der Stadt (DE); Thomas Engelberg, Hildesheim (DE); Christian Schedler, Eldingen (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 10/593,515

(22) PCT Filed: Jan. 12, 2005

(86) PCT No.: PCT/EP2005/050103
§ 371 (c)(1),
(2), (4) Date: Jul. 17, 2007

(87) PCT Pub. No.: WO2005/090118
PCT Pub. Date: Sep. 29, 2005

(65) Prior Publication Data
US 2008/0246318 A1    Oct. 9, 2008

(30) Foreign Application Priority Data
Mar. 19, 2004    (DE)    ........................ 10 2004 013 598

(51) Int. Cl.
*B60R 21/00* (2006.01)
(52) U.S. Cl. ........................ 180/268; 280/735; 701/45
(58) Field of Classification Search .................. 280/735; 701/45
See application file for complete search history.

(56) References Cited

U.S. PATENT DOCUMENTS

| | | | | |
|---|---|---|---|---|
| 5,983,147 | A * | 11/1999 | Krumm | 701/45 |
| 6,553,296 | B2 * | 4/2003 | Breed et al. | 701/45 |
| 6,856,873 | B2 * | 2/2005 | Breed et al. | 701/45 |
| 6,907,335 | B2 * | 6/2005 | Oswald et al. | 701/45 |
| 7,108,280 | B2 | 9/2006 | Abe | |
| 7,164,117 | B2 * | 1/2007 | Breed et al. | 250/221 |
| 7,299,119 | B2 * | 11/2007 | Sugiura | 701/45 |
| 7,359,527 | B2 * | 4/2008 | Breed et al. | 382/100 |
| 7,370,883 | B2 * | 5/2008 | Basir et al. | 280/735 |
| 7,406,181 | B2 * | 7/2008 | O'Boyle et al. | 382/104 |
| 7,492,923 | B2 * | 2/2009 | Bothe et al. | 382/104 |
| 2002/0125050 | A1 | 9/2002 | Breed et al. | |
| 2003/0234519 | A1 | 12/2003 | Farmer | |

FOREIGN PATENT DOCUMENTS

| | | |
|---|---|---|
| DE | 101 33 759 | 1/2003 |
| JP | 2002264747 | 9/2002 |
| JP | 2004001591 | 1/2004 |
| WO | WO 01/64468 | 9/2001 |
| WO | WO 03/089277 | 10/2003 |

* cited by examiner

*Primary Examiner*—Toan C To
(74) *Attorney, Agent, or Firm*—Kenyon & Kenyon LLP

(57) ABSTRACT

A device for adjusting seat components as a function of a signal from a video sensor system. Furthermore, a safety belt is adjusted as well as a function of the signal. This adjustment is carried out as a function of the occupant class, the occupant volume, the occupant pose, and the head position.

11 Claims, 3 Drawing Sheets

DEVICE FOR ADJUSTING SEAT COMPONENTS

BACKGROUND INFORMATION

From PCT International Patent Publication No. WO 01/64468 a method for adjusting parameters that are relevant to the use of a motor vehicle is known where the position of at least one body part of an occupant is ascertained with the aid of a three-dimensional imaging method, at least one component relevant for the use of the vehicle being moved into a position as a function of the position of the surface region.

In addition, from German Patent No. DE 101 33 759 a device is known for detecting the extension of the safety belts in the vehicle, such detection being carried out with the aid of an image-generating sensor.

SUMMARY OF THE INVENTION

The device for adjusting seat components according to the present invention has the advantage over the related art that the video sensor system now generates the signal as a function of an occupant class, an occupant volume, an occupant pose, and a head position. This allows accurate inferences to be made about the occupant and his or her individual position, so that, in response thereto, an optimal adjustment of the seat components or the safety belt is possible, thereby providing optimal protection in a crash. Furthermore, the seat belt is adjusted as well, so that the occupant is optimally protected with respect to the seat contour and the protective measures to be utilized in a potential crash. This allows an automatic conditioning of the seat and safety belt settings, for instance the height of the headrest and belt mounting, in a manner that is adapted to the individual occupant.

It is especially advantageous that the device also allows the vehicle seat and the safety belt to be adjusted for a particular occupant pose even if the occupant briefly assumes a different pose. To a large degree this is possible because the occupant pose is ascertained by the video sensor system in a continuous manner and is taken into account when adjusting the seat by calculating back to the particular occupant pose for which the vehicle seat and the safety belt are to be adjusted. In this way it is possible, for instance, to adjust the seat for an erect seating posture even if the occupant is briefly leaning forward. As a result, the occupant is able to move freely during the adjustment process and need not remain in a particular position.

Furthermore, it is of advantage that the device carries out the seat adjustments continuously. That is to say, each change in the seating position by the vehicle occupant is followed by a corresponding adjustment of the moveable seat components. As an alternative, it is possible to predefine the time period during which the adjustment takes place. This input may be set in the factory or also by a user, the time period including both the measuring time and the adjustment. For example, this time period may cover 10 seconds, in particular following the start-up of the vehicle, i.e., the switching-on of the ignition. Nevertheless, even in a continuous adjustment, care must be taken that the response will not occur too fast, that is to say, not every change should immediately lead to a corresponding adjustment of the seat elements. It may be specified, for instance, to wait out a specific number of measuring points and then modify the seat elements as a function of these measuring points.

It is advantageous, in particular, that the adjustment of the seat elements is implemented as a function of a signal from a precrash sensor system, such as an environment sensor system or a crash sensor system. Then, prior to the occurrence of a crash or a braking action or a serious injury, the seat is still optimally adjusted so as to minimize the effects of a crash. The adjustment thus takes place only in situations that constitute a danger to the vehicle occupants.

To determine the optimal seating position and the occupant classification, the device according to the present invention is connected to a memory which stores the necessary data, for instance the limits for the occupant classification and data regarding the seat, such as the moveability of seat elements, size, etc. Using this data, it is then possible to carry out the appropriate seat adjustments for the particular occupant.

DETAILED DESCRIPTION

Figure 1:
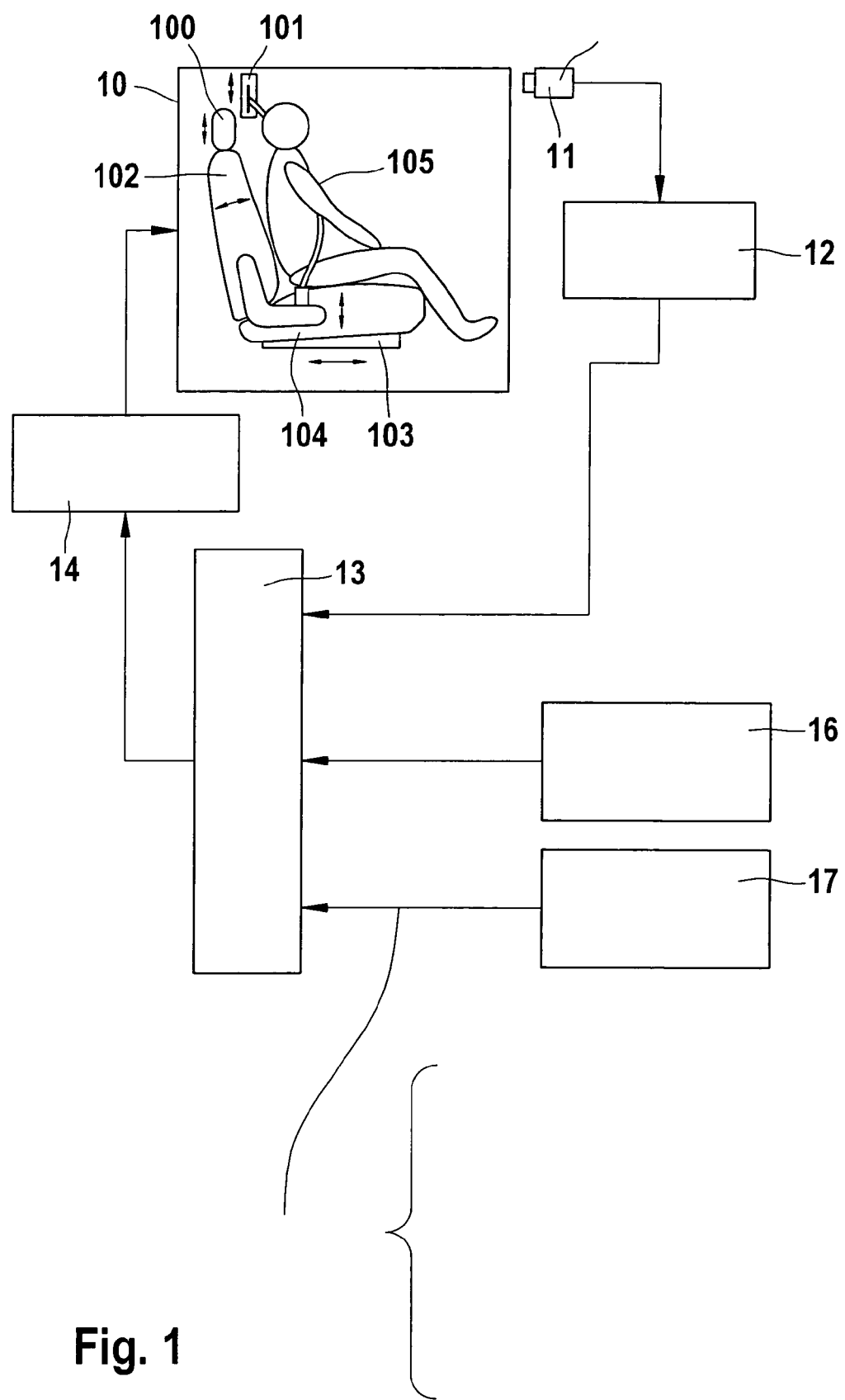
FIG. 1 shows a first block diagram of the device according to the present invention.
Figure 2:
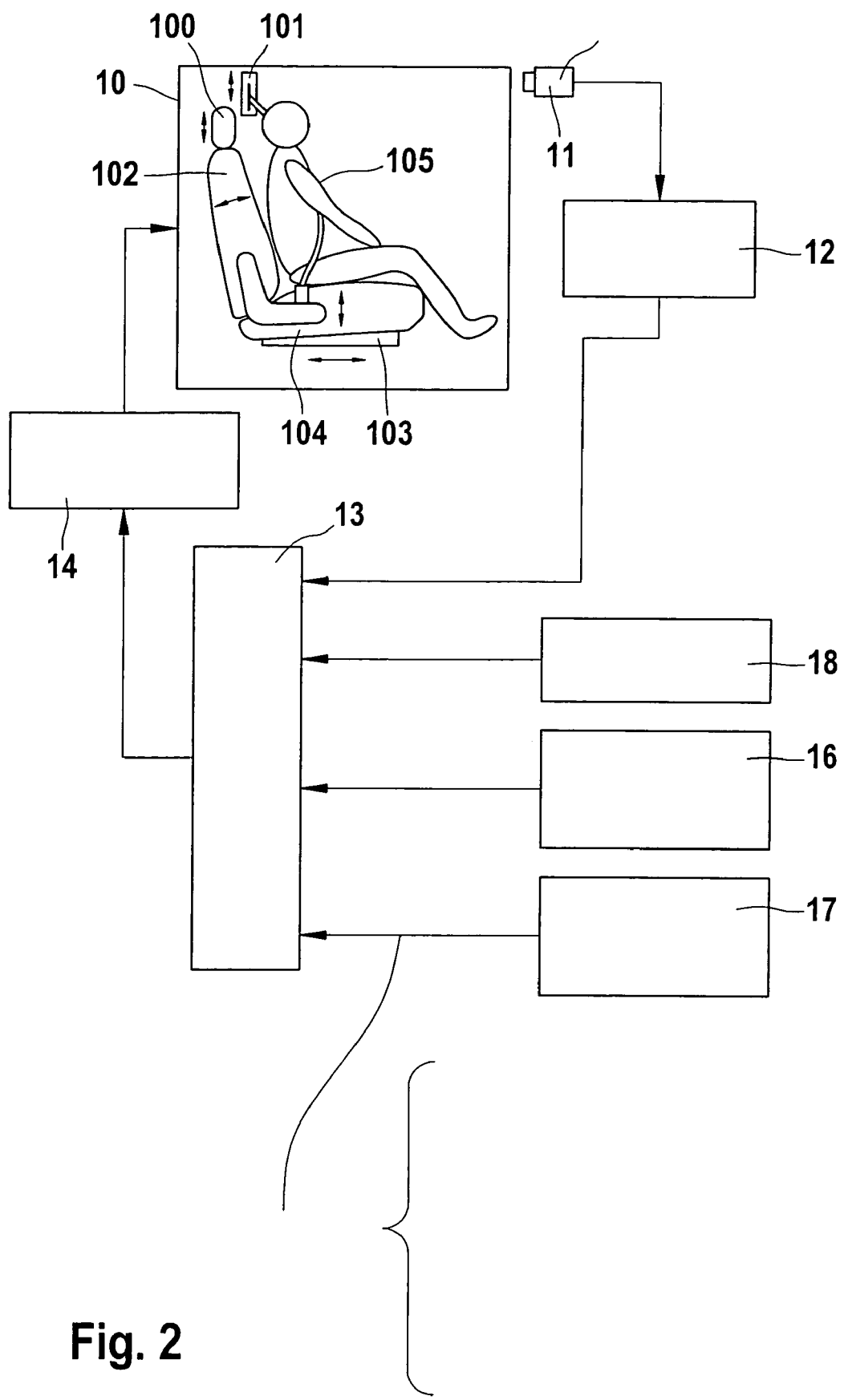
FIG. 2 shows a second block diagram of the device according to the present invention.

The adjustment of the vehicle seats and safety belts, for instance the belt attachment, is handled in the conventional manner, manually by the vehicle occupants or with the aid of an actuator sensor switch or using buttons. In doing so, it often happens that adjustments which are not optimal for the effect of the restraining means or passenger protection systems are selected.

According to the present invention it is provided to implement such adjustments in an automatically adaptive manner as a function of a signal from a video sensor system which characterizes the vehicle occupant in a comprehensive manner via various features. In the process, not only are the dimensions of the individual passenger taken into account, but his pose and head position as well.

The device according to the present invention may be configured in the factory or by the user via a suitable human-machine interface (HMI) in the following manner:

1. The data recorded by the video sensor are continually used to regulate the seat and belt settings.
2. The data recorded by the video sensor are used to adjust the seat and belt settings for a period of time, defined by the factory or the user, for instance for a duration of 10 second following the start-up of the engine, for example.
3. According to point 2, the seat and belt adjustments are implemented at the outset and adjusted in a precrash or crash situation in accordance with the instantaneous information provided by the video sensor and additional sensors such as an acceleration sensor or rollover sensor.
4. The data continuously recorded by the video sensor are stored and used only in a precrash or crash situation in order to optimally adjust the seat and belt positions. In this case the occupant will be able to freely adjust the seat and belt settings.

With the aid of a video sensor system, a seat and belt position offering optimal passenger protection in a crash situation is adjusted automatically. This is possible by an adjustment of the seat and belt position that is tailored to the individual occupant.

Since the device according to the present invention automatically ascertains the adjustment of the seat and belt position and since the actuator system is controlled accordingly, the passengers are not required to have knowledge of an optimal seat and belt setting and no longer need to make any manual adjustments.

Another advantage results from the fact that the optimal seat and belt settings ascertained with the aid of the video sensor are also able to be stored. As a result, in the precrash case an individual seat and belt position that is optimal for the crash case may be called up and adjusted in a timely manner even if the occupant has initially or subsequently adjusted the seat and belt position, for instance for greater seating comfort. The instantaneous situation in the vehicle passenger compartment, which is continuously ascertained with the aid of the video sensor, also may be taken into account in the process. This results in additional advantages of the present invention, since, for example, with specific passenger poses, when the driver leans forward toward the glove compartment, for example, it is possible to automatically implement a correspondingly adapted conditioning of the restraining systems and the seat and belt position in a precrash and in a crash situation.

FIG. 1 shows a device for adjusting seat elements. In addition, the safety belt is adjusted here as well. A video sensor 11 records the vehicle passenger compartment in a contactless manner. The occupant class, for instance 50% women, 50% men, the occupant volume, i.e., the corpulence of the occupants, the seat height of the occupants, the occupant pose, a 3-D head position and possibly also the viewing direction of the occupant are ascertained in a downstream unit for signal and image processing 12.

Using a control device 13, the actuator system for seat and belt adjustment 14 is controlled in such a way that an optimal efficacy of the restraining systems is ensured. To this end, headrest 100, backrest 102, longitudinal seat position 103, and height of belt-attachment point 101, among others, are able to be adapted to the size of individual occupant 105. A memory unit which the computing unit of control device 13 may access but which may also be accessed from the outside via a diagnostic interface, is generally integrated in control device 13. This memory unit usually stores the standard body measurements of the occupant class, for instance according to DIN 33402-2, the relevant construction data of the vehicle passenger compartment such as the seat geometry, the degrees of freedom in the seat adjustment, as well as strategies for the seat adjustment, which may be available in the form of different characteristic curves, for example. Moreover, seat settings that are specific to the occupants and were ascertained during the start-up of the vehicle with the aid of the passenger compartment sensor system, for instance, may be stored therein. These seat settings specific to the occupants may then be called up in the precrash case, for example, and used to optimally adjust the seat.

Figure 3:
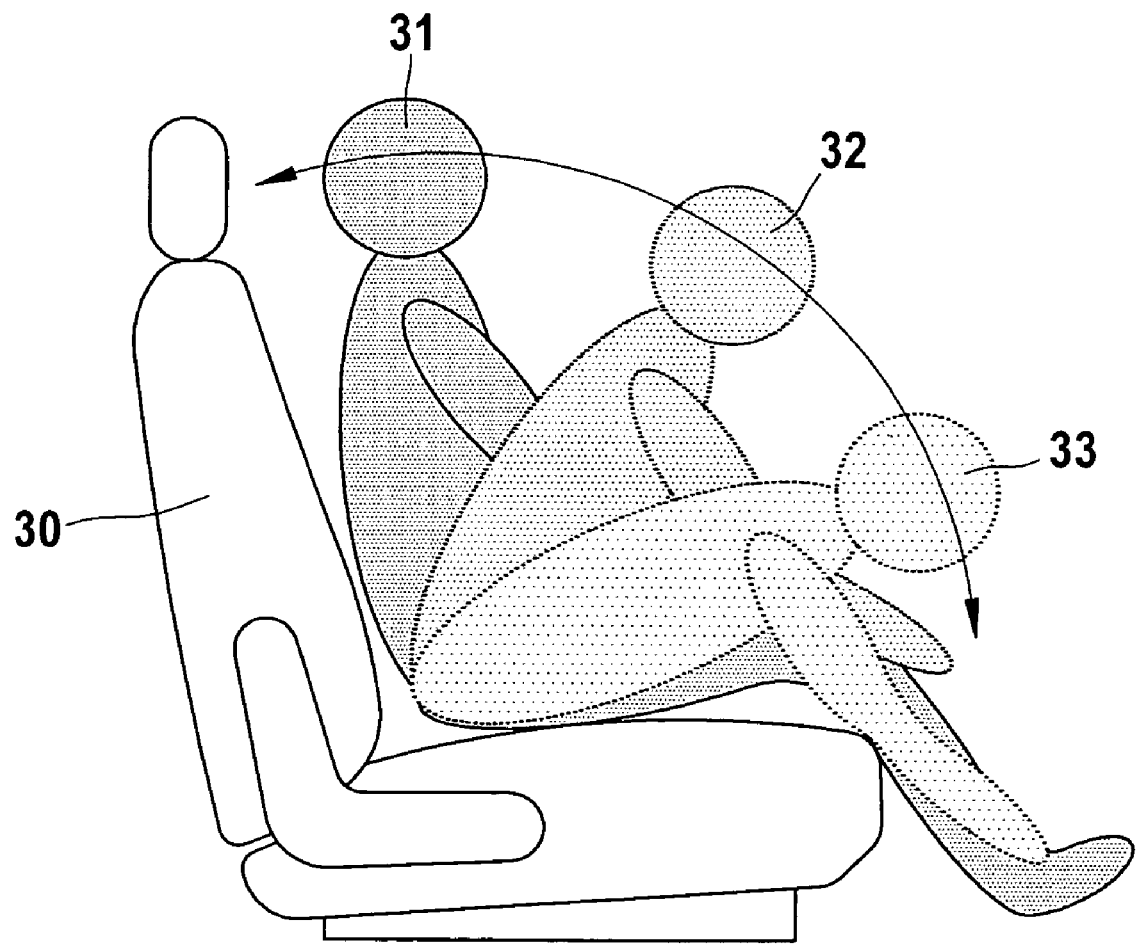
FIG. 3 shows positions that an occupant may assume during a ride.

On the basis of the occupant class determined by video sensor 11, the standard body measurements such as height, length of the legs and the upper torso, may be read out from the memory unit integrated in control device 13. Using the measured head position and occupant pose, a seat position and the safety belt may then be set in a manner adapted to the individual occupant. The adjustment procedure may thus be carried out even with a variety of occupant poses since it is possible to calculate back to a seat and belt setting for an erect occupant pose. This results from FIG. 3, for example, which shows three different occupant poses on a seat 30: a forward-leaning pose 33, an erect pose 31, and an in-between pose 32.

As an option, the seat and safety belt position that is optimal for the effectiveness of the restraining systems, and which was ascertained with the aid of the device according to the present invention, may be adjusted immediately or stored in a memory so that it is able to be called up in a precrash situation, for instance, and set automatically. In addition, in a precrash situation, the optimal seat and safety belt position may be implemented as a function of the individual situation in the vehicle passenger compartment, for instance as a function of the instantaneous occupant pose, which in turn is ascertained with the aid of the passenger compartment sensor, i.e., video sensor 11. A precrash situation may be detected by additional sensors 18, for example with the aid of video or radar sensors oriented in the direction of the outside environment of the vehicle. Furthermore, additional sensors 18 may provide information about the instantaneous driving state such as the vehicle speed and detection of an imminent vehicle rollover. This information, too, may be used for a situation-adapted adjustment of the seat and safety belt position within the meaning of an optimal effectiveness of the restraining system.

Using a human-machine interface 17, but alternatively also with the aid of a factory-implemented setting in control device 13, for instance, the following operating modes may be selected:

Mode 1: The control of the seat and belt actuator system is carried out continuously using a permanently active control on the basis of the measured passenger compartment sensor signals.

Mode 2: Adjustment of the seat actuator system on the basis of the video sensor signals, which are measured over a previously defined time period, for instance with a recording time of 10 seconds.

Mode 3: Manual control of the seat actuator system via a suitable human-machine interface 16.

What is claimed is:

1. A device comprising:
   a video sensor system for generating a signal as a function of an occupant class, an occupant volume, an occupant pose, and a head position; and
   an arrangement for adjusting seat components and at least one safety belt as a function of the signal from the video sensor system.

2. The device according to claim 1, wherein the adjustment of the seat components and of the safety belt is carried out independently of changes in the occupant pose that occur briefly over a predefined first time period.

3. The device according to claim 1, wherein the device is configured for a continuous adjustment of the seat components.

4. The device according to claim 1, wherein at least one second time period is predefined during which the adjustment takes place.

5. The device according to claim 4, wherein the at least one second time period is predefined by a user.

6. The device according to claim 1, wherein the adjustment is made when one of an environment and a crash sensor system indicates a situation.

7. The device according to claim 1, wherein the device is adapted to be connected to a memory in which body measurements for occupant classes as well as seat and belt data are stored.

8. The device according to claim 1, wherein the adjustment of the seat components and of the safety belt is carried out independently of changes in the occupant pose that occur briefly over a predefined first time period, and wherein the device is configured for a continuous adjustment of the seat components.

9. The device according to claim 8, wherein at least one second time period is predefined during which the adjustment takes place, and wherein the at least one second time period is predefined by a user.

10. The device according to claim 9, wherein the adjustment is made when one of an environment and a crash sensor system indicates a situation, and wherein the device is adapted to be connected to a memory in which body measurements for occupant classes as well as seat and belt data are stored.

11. The device according to claim 8, wherein the adjustment is made when one of an environment and a crash sensor system indicates a situation, and wherein the device is adapted to be connected to a memory in which body measurements for occupant classes as well as seat and belt data are stored.

* * * * *